March 27, 1934.   C. R. MEITZLER   1,952,384
ELECTRIC CIRCUIT CONTROL MEANS
Original Filed Sept. 16, 1929   8 Sheets-Sheet 1

Fig.1

INVENTOR
Charles R. Meitzler
BY Edward H. Campston
his ATTORNEY

March 27, 1934.　　C. R. MEITZLER　　1,952,384
ELECTRIC CIRCUIT CONTROL MEANS
Original Filed Sept. 16, 1929　　8 Sheets-Sheet 3

INVENTOR
Charles R. Meitzler
BY Edward H. Cumpston
his ATTORNEY

March 27, 1934.  C. R. MEITZLER  1,952,384
ELECTRIC CIRCUIT CONTROL MEANS
Original Filed Sept. 16, 1929   8 Sheets-Sheet 6

INVENTOR
Charles R. Meitzler
BY Edward H. Dumpston
his ATTORNEY

March 27, 1934.  C. R. MEITZLER  1,952,384
ELECTRIC CIRCUIT CONTROL MEANS
Original Filed Sept. 16, 1929   8 Sheets-Sheet 7

INVENTOR
Charles R. Meitzler
BY Edward H. Dumpston
his ATTORNEY

March 27, 1934.   C. R. MEITZLER   1,952,384
ELECTRIC CIRCUIT CONTROL MEANS
Original Filed Sept. 16, 1929   8 Sheets-Sheet 8

Patented Mar. 27, 1934

1,952,384

UNITED STATES PATENT OFFICE

1,952,384

ELECTRIC CIRCUIT CONTROL MEANS

Charles R. Meitzler, Rochester, N. Y., assignor of one-half to Oscar H. Pieper and one-half to Alphonse F. Pieper, both of Rochester, N. Y.

Original application September 16, 1929, Serial No. 392,879. Divided and this application April 17, 1931, Serial No. 530,824

4 Claims. (Cl. 200—7)

The present invention relates to electric circuit control means and has for its object to provide more particularly, an improved switch mechanism for controlling the circuits of an electrically driven work performing mechanism, such for example, as one or more chair raising sections or columns.

A further object of the invention is to provide an improved switch for controlling the circuit of a motor for operating a chair raising mechanism arranged for manual control and also for control by movement of said raising mechanism.

A further object of the invention is to provide in conjunction with electrically operated work performing means improved switch mechanisms, electrically connected, and responsive one to manual control means and another to said work performing means.

A further object of the invention is to provide improved electric circuit control means comprising fixed and movable switch contacts, together with a circuit closing device and operating mechanism for said control means and said device arranged to close the contacts in advance of the closing of the circuit by said device.

A further object of the invention is to provide improved circuit control means including combined circuit closing devices, one of which is of the liquid contact type, said means also including operating mechanism for moving the devices at relatively different times both in the circuit closing and opening operations whereby to avoid arcing during the opening and closing periods.

A further object of the invention is to provide improved means for controlling the movement of the liquid contact device for closing the circuit whereby to prevent undue agitation of the liquid.

A still further object of the invention is to provide in a tiltable mercury tube switch improved operating mechanism for the same including cam means and control means movable in opposite directions to effect operation of the cam means whereby to close the switch regardless of the direction of movement of the control means.

A further object of the invention is to combine with a switch having fixed and movable contacts for controlling one or more electric circuits, a second switch including a current conducting medium responsive to the action of gravity, preferably a liquid, such for example, as mercury, the second switch operating to make and break the circuit when the movable contacts of the first mentioned switch are in engagement with the fixed contacts whereby to avoid arcing when shifting the movable contacts to and from engagement with the fixed contacts.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

The invention described herein embodies improved electric circuit control means, the present application being a division of my co-pending application for Extensible chairs, filed September 16, 1929, Serial No. 392,879.

In the present embodiment of the invention I have shown a motor driven work performing mechanism comprising, by way of example, a chair raising mechanism, the chair having extensible sections and a suitable electrically driven operating mechanism therefor, either or both of which may be of any preferred construction, the same being shown to illustrate one example of the application of the improvements and the combinations embodying the invention. The chair sections are operated by a reversible electric motor the circuit of which is under the control both of a reversing and a limit switch, the former constituting the operating switch for reversing the motor circuit during the normal raising and lowering movements of said sections, the latter serving to automatically break the circuit when the sections approach their upper and lower limits of movement in cases where the operator may fail to release the pedal by which the reversing switch is closed.

The reversing switch comprises a fixed and a movable contact device, each of which may include a single contact or a plurality of contacts depending on whether one or more circuits are to be controlled. In the present embodiment each device includes a plurality of contacts and the movable device is arranged to swing from a normal open position to either of two circuit closing positions. In so doing the arrangement is such that the circuit will be broken in advance of the separation of said devices when moving one from circuit closing relationship with respect to the other, whereby to prevent arcing at such times. Likewise when moving one into engagement with the other the circuit will not be completed until subsequent to such engagement whereby arcing will be prevented. The means for opening and closing the circuits under these conditions comprises a relatively quick acting switch, or what may be termed a make and break device which preferably includes a shiftable contact element or medium responsive to the action of gravity, such for example as a mercury tube switch, or one embodying a receptacle in which a liquid of any suitable nature may be shifted to and from circuit closing position.

Figure 3:
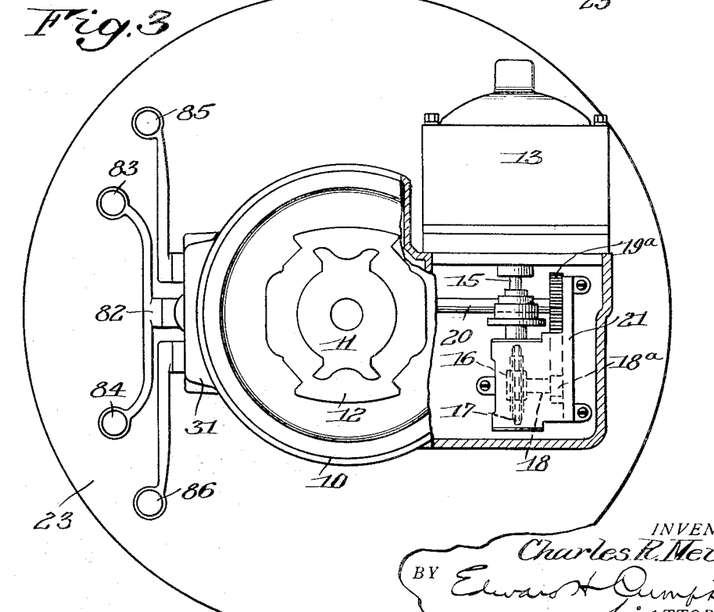
Fig. 3 is a plan view of the chair base, partly in section, showing the relationship of the switch pedals to the motor and a portion of the chair raising means operated thereby.

Referring to the drawings, 10 represents the base of the chair within which is disposed inner and outer columns or sections 11 and 12 respectively and with which is associated a reversible electric motor 13 for operating the sections to raise the chair seat frame 14. The operating means interposed between the motor and extensible sections may be of any preferred type suitable for the purpose. This mechanism which will be briefly described comprises a worm shaft 15 suitably connected with the motor shaft 15a. A worm 16 on the worm shaft meshes with a worm wheel 17 on a shaft 18 carrying a pinion 18a for driving a gear 19 which serves to drive a similar gear 19a on a shaft 20. The shaft 20 has its outer end journaled in the gear casing 21 and its inner end journaled in a standard 22 projecting from the bottom 23 of the base into the column 11. The drive shaft 20 has a sprocket 24 thereon for driving a chain 25 extending over a pulley 26 journaled in the top of the standard, the chain extending under a pulley (not shown) journaled on the bottom of the outer column 12, from which pulley the chain extends upwardly outside of the column 12 to a point where it is anchored upon the upper end of the base 10. The opposite end of the chain is carried under the sprocket and is extended upwardly a short distance and connected with a vertically disposed rod (not shown) having its upper end yieldably connected with the top of the inner column 11 all as clearly shown in Patent Number 1,700,741. The sprocket chain serves to raise the outer column 12 and the inner column is raised by the outer column by means of a pair of chains or flexible elements 27 extending over pulleys 28 journaled on the upper end of the outer column. The chains have their lower ends connected with lugs 29 and 30 carried respectively by the inner column 11 and the bottom 23 of the base as indicated in Fig. 3.

The base 10 is provided with an opening at one side which is closed by a bracket or platelike member 31 forming a support for the reversing switch, the support being removably secured to the base preferably by a suitable number of screws or bolts. At a point opposite the support the base is provided with a vertically disposed wall portion 32 for receiving certain parts of the switch mechanism described hereinafter.

Figure 4:
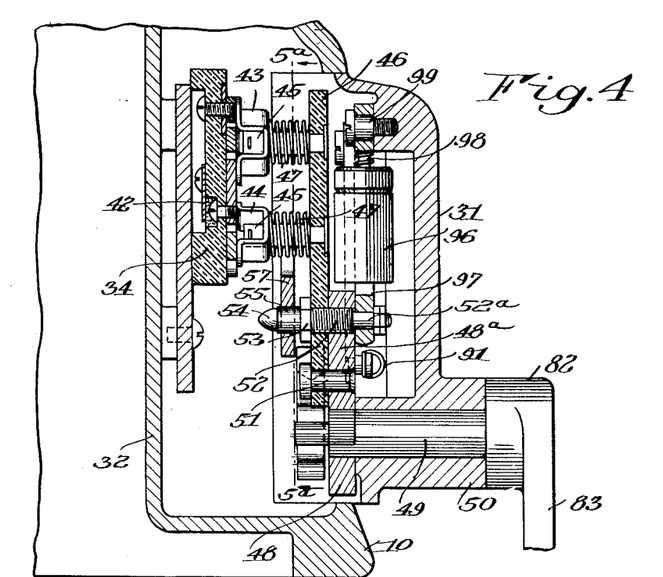
Fig. 4 is a transverse sectional elevation through the reversing switch taken on line 4a—4a of Fig. 1.

Spaced from and secured to said wall is a plate 33 on which is mounted a switch block 34 formed of suitable insulating material. The switch block is provided on its front face with a plurality of spaced contacts 35 to 41 inclusive, the contacts 40 and 41 being connected at the rear of the switch block by a metal strip 42, as best shown in Figs. 4 and 5. The upper and lower movable contacts of the switch are indicated respectively at 43 and 44, and are inserted on squared shanks 45, the outer ends of which are fixed upon and held against turning by an operating arm 46, between which and the contacts are positioned springs 47 for urging said contacts into engagement with the fixed contacts on the block 34, Fig. 4. The arm 46 is formed of insulating material and has its lower end suitably secured upon an upstanding element 48 fixed on a pivot member 49 journaled in a bearing 50 on the removable bracket or support 31. The contact members on the switch block 34 and those on the arm 46 constitute what may be termed separate contact devices, one of which is arranged to cooperate with the other as will hereinafter appear to control different electric circuits. Preferably the arm 46 is secured to the upstanding element 48 by means of a rivet or bolt 51 and also by a screw 52 threadedly engaging said element and having a clamping nut 53 for securing the arm thereon. The screw has an extended portion 54 at its inner end on which is mounted a roller 55 arranged to travel in an arcuate slot 56 formed in a lever 57 arranged to swing on a pivot bolt 58 connected with the plate 33 and carrying a spacing element 59, Fig. 6. The spacing element serves to hold the lever the desired distance from said plate at one end while a second spacing element 60 functions in the same manner at the opposite end of the lever. Spacing element 60 is supported by a bolt 61 connected with the plate 33, the bolt being projected through a slot 62 in the lever. The bolt 61 forms a stop for limiting the up and down movement of the lever which is normally held in the position shown in Fig. 5 by a spring 63 interposed between the lever and the plate 33, the lever being shown in its lowest operating position in Fig. 7. The lever is provided for operating a pivoted holder 64 to move a mercury tube switch element 65 thereon from the normal open position shown in Fig. 5 to the closed position shown in Fig. 7. The normal position of the tube is also shown in Fig. 8, and in Fig. 9 it is shown in circuit closing position.

Figures 5, 6, 8:
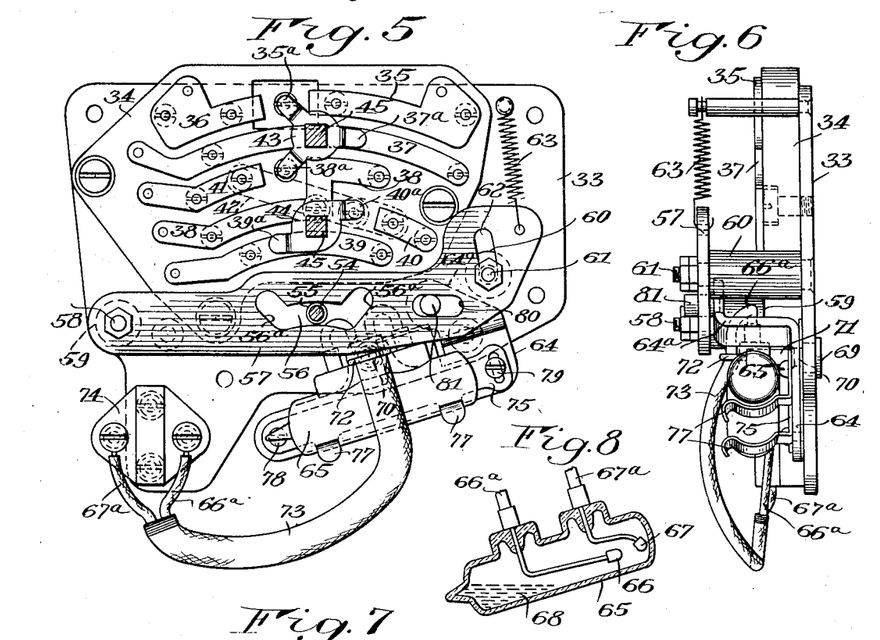
Fig. 5 is a sectional elevation taken substantially on line 5a—5a of Fig. 4.
Fig. 6 is an end elevation of the switch unit shown in Fig. 5 as viewed from the right thereof.
Fig. 8 is a sectional view through the mercury tube of the reversing switch shown tilted to a position corresponding to that indicated in Fig. 5 in which it is in circuit breaking position.
Figure 9:
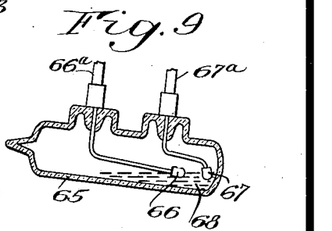
Fig. 9 is a similar view showing the tube in the circuit closing position indicated in Fig. 7.

The tube 65 or any suitable receptacle is provided with a pair of contacts 66 and 67 between which connection is established by a suitable contact medium responsive to the action of gravity, and which preferably comprises mercury as shown at 68 in Figs. 8 and 9. When the tube is swung from the normal position shown in Fig. 8 the mercury will assume the circuit closing position shown in Fig. 9 which is common to both circuit closing positions of the movable contact holding arm 46, the normal position of the arm being shown in Fig. 10 and one of the closing positions being indicated in Fig. 12. The tube holder 64 is mounted to swing on a pivot pin 69 carried by the base-plate 33. The pin is provided with a head 70, Fig. 6 countersunk within the holder to secure it in position and from the head projects an extension 71 carrying a looped portion 72 through which projects one end of a flexible covering 73 for the circuit connections 66a and 67a with which the contacts 66 and 67 within the mercury tube are respectively connected. The connections 66a and 67a lead to binding posts carried by a suitable support 74 on the base-plate 33 as shown in Figs. 5 and 6.

A suitable member is provided for attaching the tube 65 to the pivoted member 64 and comprises a plate 75 having upper and lower spring fingers 76 and 77 respectively, partially surrounding the tube, which can be readily detached from the fingers. The plate 75 is pivoted upon the support 64 at 78 and the opposite end of the plate is slotted to receive a clamping screw 79 for securing it in different positions of adjustment whereby to vary the inclination of the tube when necessary for the purpose of insuring proper submergence of the contacts 66 and 67 within the mercury.

The holder 64 for the tube, as previously stated is pivoted upon the base-plate 33 at 69 to permit the tube to be swung to and from circuit closing position. The lever 57 constitutes the operating means for the holder and is provided with a slot in which is disposed a pin 81 on the front arm-like portion 64a of the holder. With this arrangement it will be seen that by depressing the lever 57 from the normal position shown in Fig. 5 to the position shown in Fig. 7, that the tube holder will be rocked about its pivotal axis to shift the tube from the circuit opening position shown in Fig. 8 to the circuit closing position shown in Fig. 9 regardless of whether or not the movable contact holding arm 46 is swung to the right or left of the neutral position indicated in Figs. 5 and 10, or in other words to its two circuit closing positions. This is due to the fact that the roller 55 on the extension 54 of screw member 52 when reaching the cam portions 56a of the lever will travel on said portions to effect depression of the lever regardless of whether or not the arm 46 is moved to the right or left of its normal position. Depression of the lever in this manner will also depress pin 81 in the slot 80 of the lever thereby rocking the tube on the holder 64 to circuit closing position which will remain in said position as long as the operator continues to hold the pedal depressed. When the pedal is released it is automatically returned to normal position by means hereinafter described thus carrying the arm 46 and roller 55 back to the normal position shown in Fig. 5 and permitting spring 63 to elevate the lever 57 which serves to return the mercury holding tube to normal circuit breaking position.

It will be noted that the upper contact member indicated generally at 43, Fig. 5 has three finger-like portions one of which 37a is always in engagement with the fixed contact 37 and the other two 35a and 38a being adapted in one circuit closing position to engage fixed contacts 35 and 38 respectively. In the other circuit closing position of the arm 46 the finger portions 35a and 38a will engage the fixed contacts 36 and 41 respectively. The lower contact element indicated generally at 44 carries oppositely disposed finger-like portions 39a and 40a, the former of which is always in engagement with the fixed contact 39 and the latter of which engages the contact 40 in one circuit closing position of the switch and the contact 38 in the opposite circuit closing position.

Figure 23:
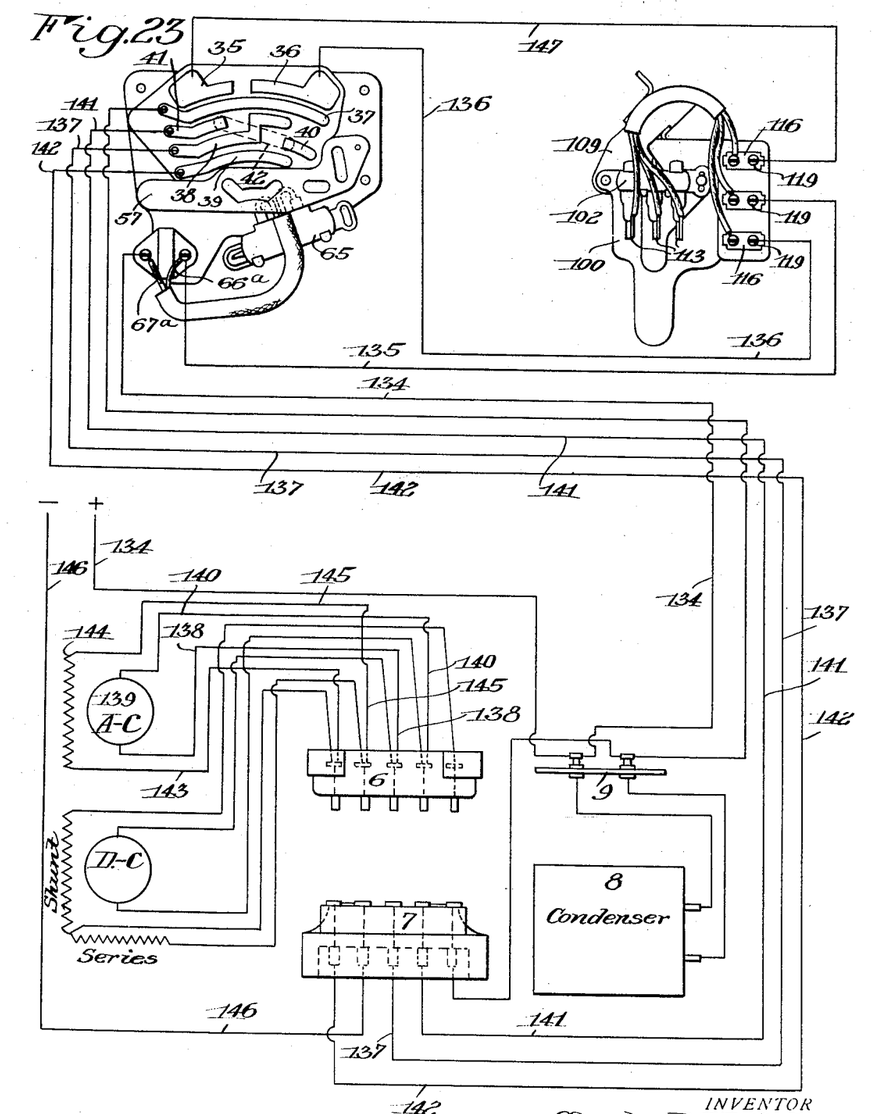
Fig. 23 is a diagrammatic arrangement illustrating the manner of connecting the reversing and limit switches both with an A. C. and a D. C. motor.

It will be noted that in swinging the contact holding arm 46 from normal to either circuit closing position that the finger-like portions 35a, 38a, and 40a will engage either set of fixed contacts with which they are arranged to cooperate in advance of the closing of the circuit by the mercury tube switch, since the latter does not begin to shift until the roller 55 has reached one or the other of the cam portions 56a of the lever, thus avoiding the possibility of arcing between the fixed and movable contacts as the latter approach the former. The same is true when moving the arm 46 from either circuit closing position back to normal position in which case the roller 55 will be moved from the cam portions 56a thus permitting spring 63 to operate the lever 57, causing it to swing the mercury tube to circuit breaking position in advance of movement of the contact members 35a, 38a, and 40a from engagement with the fixed contacts with which they cooperate. The circuit is therefore broken while the movable contacts are in engagement with the fixed contacts so that there is no chance of arcing upon separation of said contacts when the arm 46 is moved back to normal position. The fixed contacts and those of the mercury tube switch have circuit connections with the reversible electric motor and limit switch as shown in Fig. 23, the arrangement of the circuits and manner of controlling the same being described hereinafter.

Figure 1:
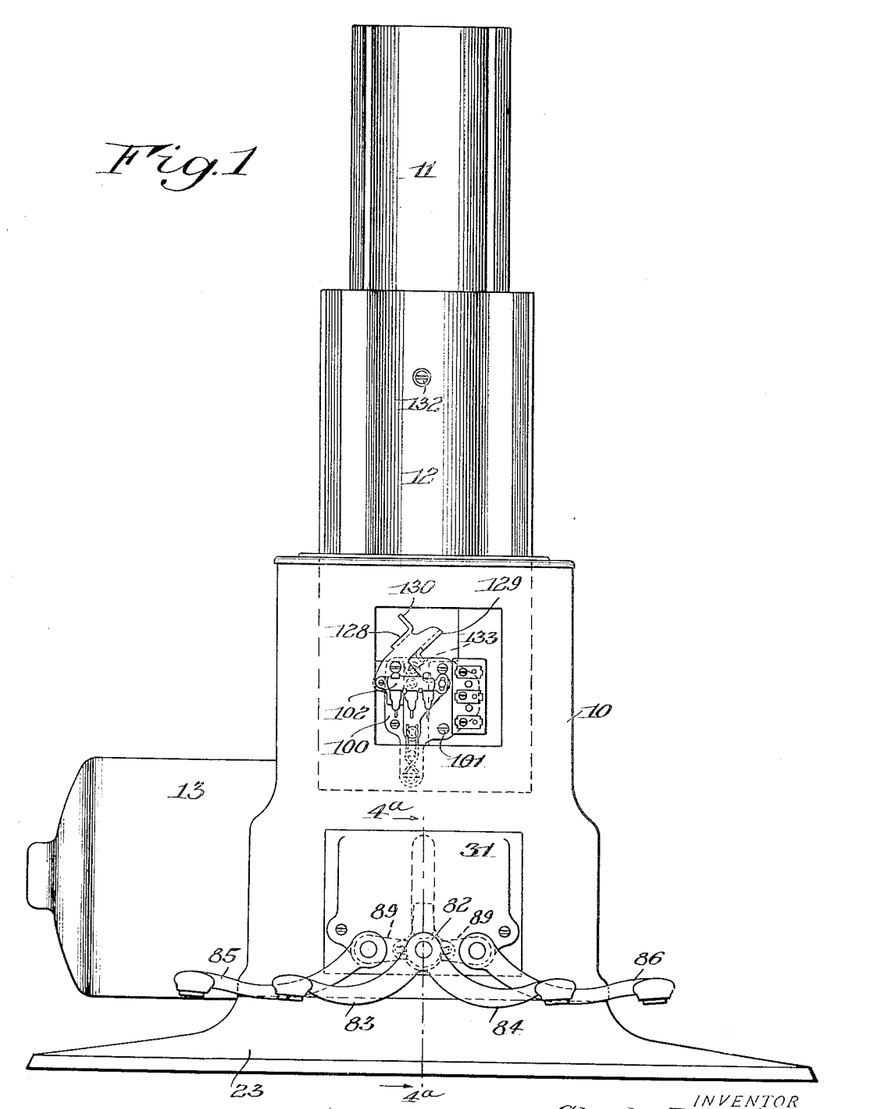
Fig. 1 is a view in elevation showing the application of the circuit control means to a dental chair.

The operating means for the reversing switch described above may be of any suitable or preferred design but preferably comprises, when the switch is employed in connection with a dental or like chair, a plurality of foot pedals, the general arrangement of which is best shown in Figs. 1 and 3. In this arrangement the pivoted member 49 carrying the contact holding arm 46 has fixed on its outer end a primary actuator 82 having oppositely projecting pedals 83 and 84 which extend on opposite sides of the center of the chair, preferably at the back thereof and in position to be conveniently depressed by the operator for moving the contact holding arm to its different circuit control positions, such movements being performed by the operator without the necessity of having to change his position when standing at the back of the chair. Projecting from the chair base on opposite sides of the actuator 82 are spaced secondary actuators 85 and 86 preferably in the form of single arm pedals. The inner ends of the pedals 85 and 86 are fixed on spaced pivot members 87 journaled in bearings 88 formed on the bracket 31. The pivot members are provided at their inner ends with arms 89 which are forked to receive pins 90 on the lever 48 fixed on the pivot member 49 and carrying the upstanding member 48a to which the arm 46 is secured as described above. Each single pedal or actuator is complementary to one pedal of the primary actuator 82 so that if the operator is standing at the left side of the chair base he will depress pedal 83 to effect movement of the contact holding arm to one circuit closing position and pedal 85 to move it to the opposite circuit closing position. Likewise if he is standing at the right side of the base, the arm 46 can be moved to one circuit closing position by depressing pedal 84 and to the other position by depressing pedal 86. It will be understood that complete operation of the switch can be effected by depressing the pedal arms 83 and 84 and that pedals 85 and 86 are added so that the operator can conveniently control the movements of the chair raising sections from either side of the base.

Figure 10:
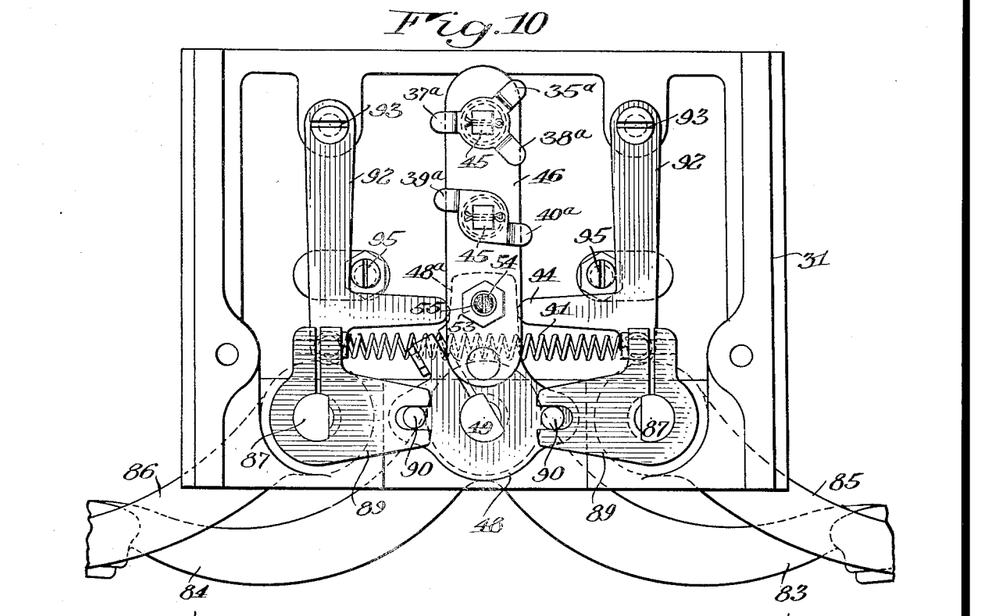
Fig. 10 is a view in elevation showing the pedal operated mechanism for controlling the movable contact elements of the reversing switch.
Figure 11:
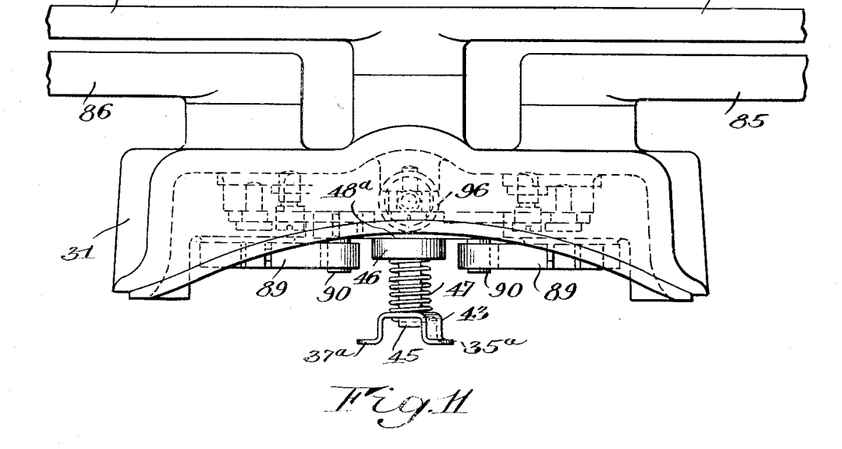
Fig. 11 is a plan view of the same.
Figure 12:
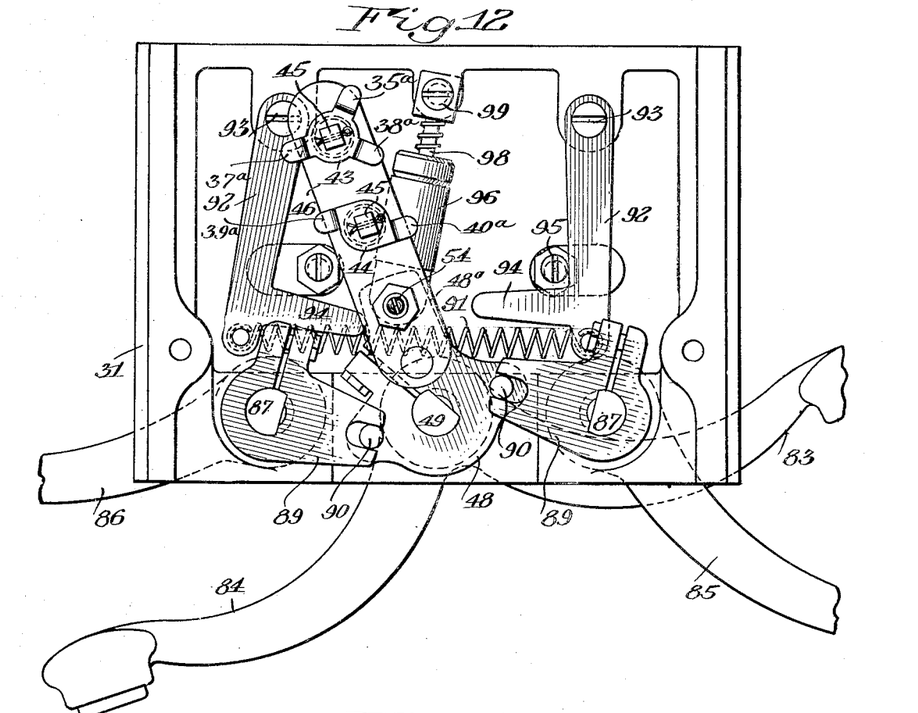
Fig. 12 is a view similar to Fig. 10 showing the contact separating arm adjusted to one of its circuit closing positions.
Figure 13:
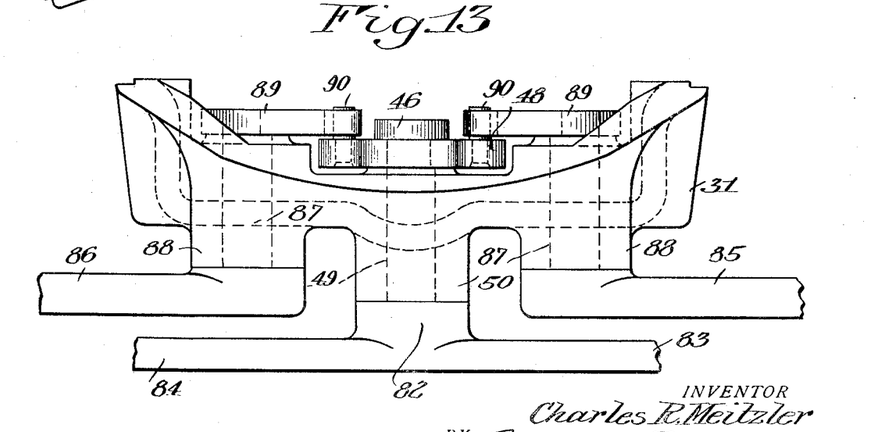
Fig. 13 is a bottom plan view of the arrangement shown in Fig. 10.

Means is provided for returning the pedals to normal position when released by the operator, which means also effects return of the contact holding arm to normal position. This means preferably comprises a spring 91 having its opposite ends fixed to the lower ends of a pair of arms 92 the upper ends of which are pivoted at 93 upon the bracket 31, Fig. 10. The arms 92 carry inwardly projecting portions 94 which engage the opposite sides of the upstanding member 48a on the lever 48, fixed on the central pivot member 49 for operation by the pedals 83 and 84. Stops 95 on the bracket 31 are so located as to be engaged by the pivoted members 92 when the contact holding arm 46 is in normal position as indicated in Fig. 10. Upon operating the pedals to swing the arm 46 to either circuit closing position the lever 48 will move one or the other of the pivoted members 92 to expand the spring 91 as indicated in Fig. 12, and when the pedal is released the spring will actuate the displaced member 92 to return the parts to normal position. The operation is the same regardless of the direction of movement of the contact holding arm. In each case one of the members 92 will be held against movement by its stop 95 while the other is operated to expand the spring for the purpose stated.

The travel of the arm 46 and contacts thereon from either of the extreme circuit closing positions to normal position is sufficient to permit the mercury tube 65 to be swung back by the lever 57 far enough from the closing position shown in Fig. 9 to allow the mercury to disengage the contacts 66 and 67 before the contacts 35a, 38a, and 40a of the arm disengage the fixed contacts on which they travel. Otherwise arcing would result upon returning the movable contacts to normal position. Furthermore when moving the switch arm 46 with the contacts thereon from normal circuit breaking position said contacts will engage the fixed contacts in advance of movement of the mercury tube switch from the position shown in Figs. 5 and 8 to a position at which the mercury will flow to circuit closing position as shown in Fig. 9 thus preventing arcing during closing of the circuit as well as when opening the same.

Means has been provided for preventing a too rapid return of the mercury tube switch and operating parts therefor to normal circuit breaking position. This means serves to avoid undue agitation of the mercury within the tube, or what may be termed splashing, which might result in momentarily re-establishing the circuit by contact of portions of the mercury with the electrodes within the tube after the parts have reached circuit breaking position. Any suitable means may be provided for this purpose, but I prefer to provide the dashpot arrangement shown in Figs. 4 and 12 in which a cylinder 96 has an extension 97 pivotally connected to a reduced portion 52a of the member 52 carrying the roller 55 as indicated in Fig. 4. The piston (not shown) operates within the cylinder and has a stem 98 the upper end of which is free to rotate on a pin 99 carried by the bracket 31, Fig. 4. The cylinder preferably contains a suitable liquid such as oil which is permitted to gradually escape through one or more openings in the piston when the arm is swung to and from normal position. The dashpot thus serves to retard the movement of the arm by the spring 91 to neutral position and likewise the lever 57 and mercury tube holder from circuit closing to circuit breaking position so that undue agitation of the mercury in the tube which might result in arcing is prevented.

Figures 14, 16:
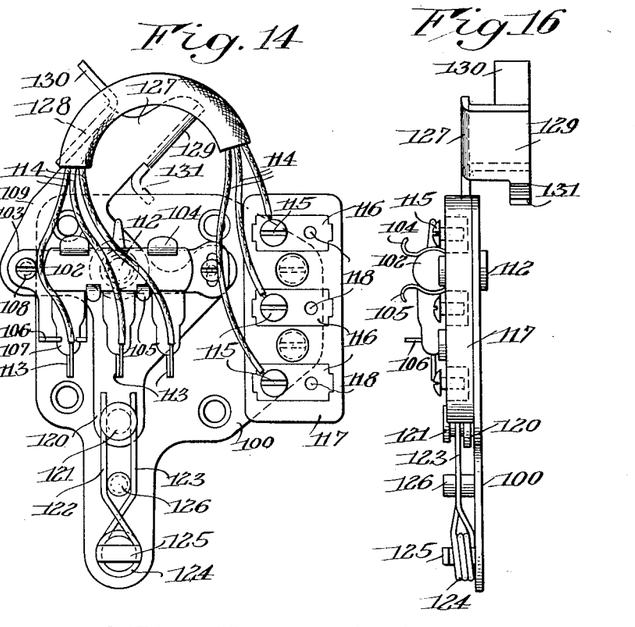
Fig. 14 is a front elevation of the limit switch shown in normal closed position.
Fig. 16 is a side elevation of the switch as viewed from the right of Fig. 14.
Figure 15:
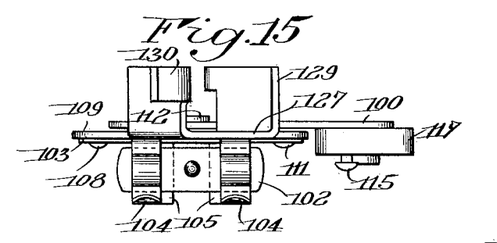
Fig. 15 is a top plan view of the same.
Figure 17:
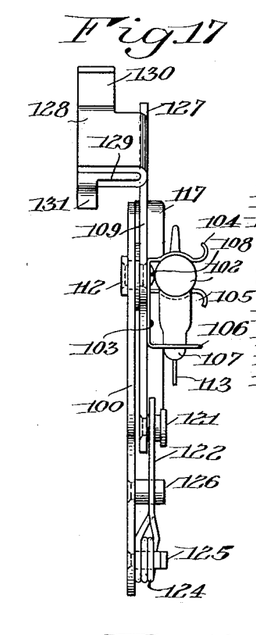
Fig. 17 is a side elevation as viewed from the left of Fig. 14.
Figure 18:
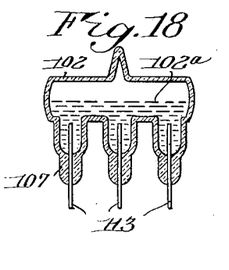
Fig. 18 is a longitudinal section showing the mercury tube of the limit switch in the normal circuit closing position.
Figure 19:
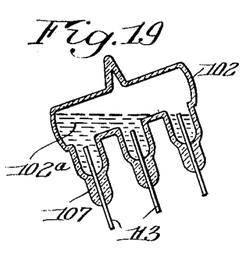
Figs. 19 and 20 are views showing the tube in the circuit breaking positions to which it is shifted by the up and down movement of one of the chair sections.
Figure 20:
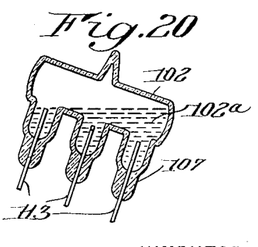
Figure 21:
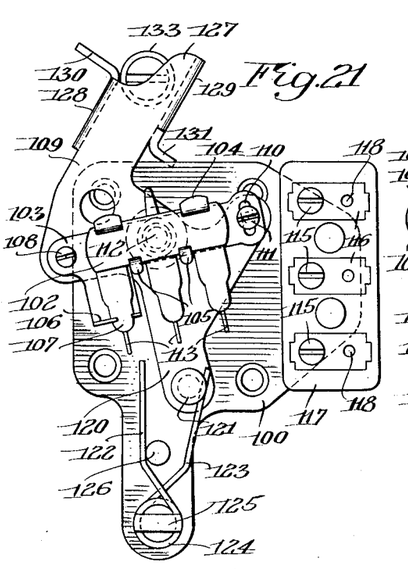
Fig. 21 is a front view of the limit switch with the mercury tube shown adjusted to one of the circuit opening positions to which it is moved by the operating member therefor on the outer chair section.
Figure 22:
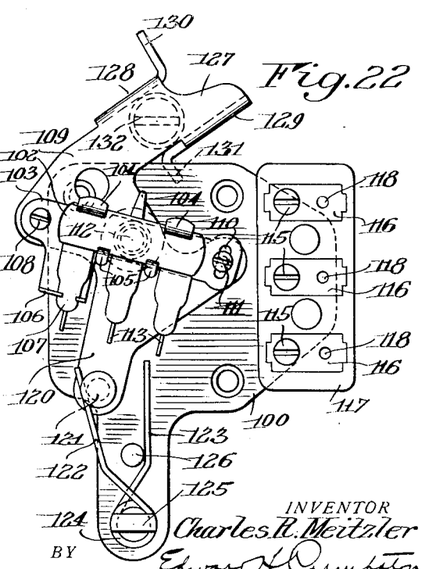
Fig. 22 is a similar view showing the tube in the other of its circuit breaking positions.

The limit switch which is preferably of the mercury tube type comprises a base-plate 100 secured in a recessed portion of the chair base 10 by a suitable number of screws 101, Fig. 1. The mercury tube 102 is carried by a holder 103 having upper and lower spring-like fingers 104 and 105 respectively which engage and support the tube and which permit it to be readily inserted upon and detached from the holder. A positioning member 106 for holding the tube against longitudinal displacement is struck upwardly from the body of the holder and is provided with an opening for receiving one of the depending contact holding portions 107 of the tube. The holder 103 is pivoted at 108 upon the tube actuator 109 and is provided with a slot 110 for receiving a clamping screw 111 threaded into the actuator, the holder being thus made adjustable so that the tube can be properly adjusted to bring the mercury to the desired level after the parts have been assembled. The actuator 109 is mounted to swing upon the base-plate, being secured thereon by a pivot pin 112 which is preferably located opposite the longitudinal axis of the tube as indicated in Fig. 14. The three contacts 113 of the tube have short flexible connections 114 which extend to binding posts 115 carried by three spaced members 116 suitably secured upon a block of insulating material 117 which in turn is connected with the base-plate 100. The members 116 are provided with threaded openings 118 for receiving binding posts 119 with which are connected the circuit wires for connecting the limit and reversing switches as indicated in Fig. 23. The tube actuator 109 is provided with a depending portion 120 on which is secured a stud 121 engaged on its opposite sides by the crossed arms 122 and 123 of a coiled spring 124, the spring being wound about a lug 125 on the lower end of the base-plate 100. A spacing member 126 is carried by the base-plate and is interposed between the arms 122 and 123 adjacent their point of crossing whereby the arms are held properly separated and in substantially parallel relation when in normal position. The arms of the springs serve to return the tube actuator from the different tilted circuit breaking positions shown in Figs. 21 and 22 to the normal circuit closing position shown in Fig. 14 when the actuator is released by the operating means therefor hereinafter described. The actuator is provided with an upstanding arm comprising a plate portion 127 having rearwardly extending spaced cam members 128 and 129 in parallel relation and inclined to the horizontal as shown in Figs. 21 and 22. The cam member 128 includes a substantially right angle portion 130 at its upper end and the cam member 129 includes a similar portion 131 at its lower end. The operating means for the actuator preferably comprises a pair of upper and lower rollers 132 and 133 respectively, which are journaled upon suitable bearings carried by the outer chair section 12 as shown in Fig. 1. In Fig. 21 the lower roller 133 in travelling upwardly on the inner face of the member 128 to the position shown has effected operation of the actuator to move the mercury tube to the circuit breaking position shown in Fig. 19, and as the roller continues to move upwardly the part 130 will be held in contact with the roller for a short period since at this time the spring arm 123 will be returning the actuator to normal position. By reason of the angular relationship of the cam part 130 to the part 128 a quick return of the actuator to normal position is prevented whereby undue agitation of the mercury within the tube is avoided when re-establishing the circuit therethrough.

The upper roller 132 will operate the actuator in the same manner as the lower roller since it will engage the part 130 on its downward movement in advance of engagement of the part 129 and on its upward movement from a point below the arm of the actuator it will engage the part 131 in advance of the part 128. It will be understood that the lower roller is employed to operate the actuator for the purpose of breaking the circuit when the chair section 12 is approaching the upper limit of its movement and that the upper roller will effect operation of the switch to break the circuit when the chair section is approaching its lowermost position. It will be further understood that operation of the limit switch to break the motor circuit is required only in cases where the operator fails to release the pedal in time to stop movement of the chair sections before they reach their upper and lower limits and that the limit switch will remain closed during all normal conditions of operation under which conditions the circuit is broken by the return of the movable contact holding arm 46 to neutral position as indicated in Figs. 5 and 10. However, if the operator should for any reason desire to effect operation of the chair sections to their extreme limits of movement, this may be readily done by holding the proper pedal depressed until the sections reach such positions, these operations being performed without danger of injury to the parts since the motor circuit will in such cases be broken in time to stop operation of the means provided for raising and lowering the sections.

In the wiring arrangement disclosed in Fig. 23 showing the manner of connecting the circuit control devices with the motor, both the A. C. and D. C. motors are shown, it being understood that the construction of the chair base is such as to permit them to be interchangeably used if desired. In this figure a connection block 6 is provided for the wires leading to both types of motors, the majority of the contacts shown being common to both circuits. A complementary connection block 7 is shown spaced from the block 6 for the sake of convenience and is provided with the same number of contacts with which are connected the circuit wires leading to and from the reversing switch.

In using a D. C. motor a suitable condenser 8 may be employed to prevent the possibility of producing a flash within the tube or of arcing when the mercury is separated from the contacts therein. A connection block 9 is provided for the wires leading to and from the condenser as indicated in Fig. 23.

Figure 7:
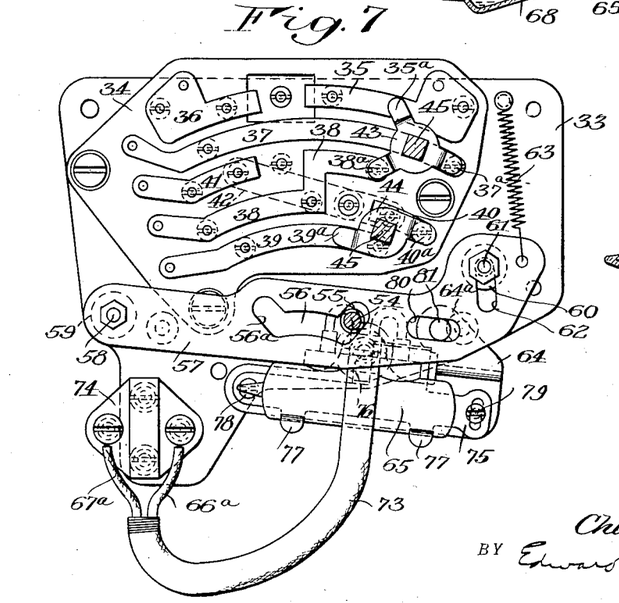
Fig. 7 is a view similar to Fig. 3 with the movable contact elements shifted from normal to one of two circuit closing positions.

It will be understood that with the movable contacts of the reversing switch in the normal inoperative position shown in Fig. 5 the motor circuit will remain open but if the operator desires to shift the contacts to the position shown in Fig. 7 he can do so by depressing either of the pedals 84 or 85 which extend in opposite directions at the back of the chair as shown in Fig. 3. With the movable contacts in the position shown in Fig. 7 the circuit, assuming that an A. C. motor is being used, will be through the main line wire 134, mercury tube switch 65, wire 135, limit switch 102, wire 136, fixed contacts 35, 37, and 38, wires 137 and 138, armature 139, wires 140 and 141, contact 41, connection 42, contacts 40 and 39, wires 142 and 143, coil 144, wire 145 to main line wire 146.

If the movable contacts are shifted to the left of the position shown in Fig. 5, the current will pass through mercury tube switch 65 to the limit switch, thence through wire 147, fixed contacts 35, 37 and 41, wires 141 and 140, armature 139, wires 138 and 137, contacts 38 and 39, wires 142 and 143, coil 144 and wire 145 to main line wire 146. In using a D. C. motor the circuit will be as traced above except that the individual connections for the motor leading to the block 6 will be different, as indicated in Fig. 23.

Figure 2:
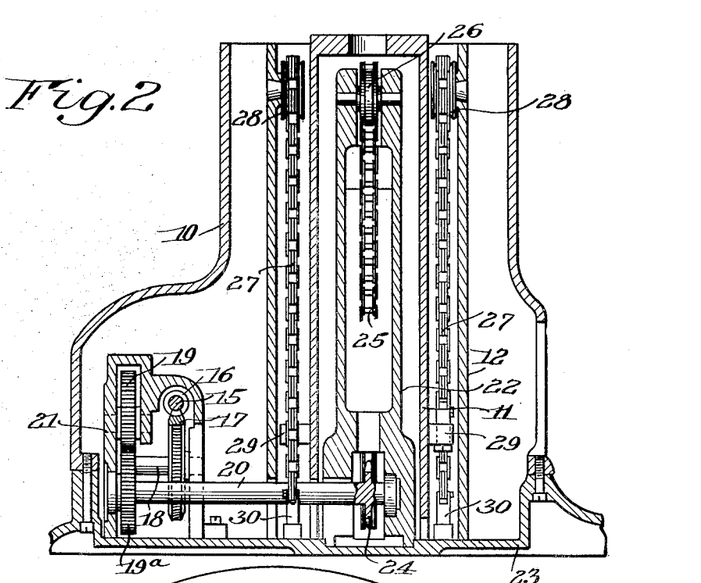
Fig. 2 is a sectional elevation through the chair base showing the raising means operated by the motor under the control of the present switch mechanism.

In the operation of the chair, assuming that it is desired to raise the sections from the position shown in Fig. 2, the operator will depress, say for example, either pedal 84 or pedal 85, to shift the movable contacts into engagement with the fixed contacts through which the circuit is to be closed in advance of the tilting of mercury tube switch 65 sufficiently to cause the mercury to flow into engagement with the contacts 66 and 67. Upon completing depression of the pedal the tube will be in the full tilted position shown in Fig. 9, thus completing the circuit to start operation of the motor. Elevation of the chair sections or columns will then begin and the upward movement of the same will be continued until the operator releases the pedal, assuming that this is done before the sections reach the upper limits of their movement. Upon releasing the pedal when the chair has reached the desired height, the spring 91 will return the movable contacts to normal position, but before they reach this position the mercury tube will have moved to a position to break the circuit so as to avoid arcing upon separation of said contacts as stated above. If now it is desired to lower the chair sections, either pedal 83 or 86 will be depressed, depending on the position of the operator with respect to the chair base, and the contact holding arm 46 will be swung to the left of the position shown in Fig. 5 to engage the fixed contacts required for closing the circuit, the connections being made in advance of the movement of the mercury tube switch to circuit closing position as above stated. Upon releasing the pedal either after raising or lowering the sections, the circuit will be broken by the flow of the mercury from engagement with the contacts within the tube 65 in advance of separation of the movable contacts and the fixed contacts in engagement therewith so that the possibility of arcing is prevented in moving the switch from closed to open position. If either in the up or down movement of the chair sections the operator should fail to release the pedal in advance of moving the sections to their upper or lower limits, one or the other of the rollers 132 and 133 on the outer column 12 will effect movement of the actuator 109 of the limit switch in the manner described above and the mercury tube 102 will thereby be swung from the normal circuit closing position shown in Fig. 14 to one or the other of the circuit breaking positions shown in Figs. 21 and 22.

I claim:

1. Electric circuit control means comprising a support, a liquid contact switch movable on the support and normally in circuit breaking position, a lever pivotally connected with the support and having a part adapted to engage and move the switch to and from circuit closing position when the lever is swung in opposite directions between predetermined positions, said lever having spaced cams thereon, an oscillatory operating member having a part for engaging either of the cams for moving the lever in one direction to effect movement of the switch to circuit closing position, actuating means for said operating member, and means for moving the lever in a direction opposite to that in which it is adapted to be moved by said operating member.

2. Electric circuit control means comprising a support, a liquid contact switch mounted to swing upon the support to and from circuit closing position and having an operating portion, a lever pivoted upon the support and receiving said operating portion of the switch and operable to move the switch to and from circuit closing position, said lever having spaced portions formed thereon, an actuating device movable in opposite directions to engage either of said portions whereby to move the lever to effect movement of the switch to circuit closing position, manually controlled means for operating said actuating device, and means for returning the lever to normal inoperative position.

3. In a reversing switch for controlling the circuits of reversible chair raising electric motors, said switch being of the class wherein a pivoted arm carrying a plurality of contacts is swung to both sides of a normal intermediate circuit breaking position for engagement with a plurality of fixed contacts at each side of said position adapted to cooperate with the contacts of the arm to effect reversal of the motor circuit, the combination with said arm and said fixed and movable contacts of a pivotally mounted liquid contact switch adapted for connection with the motor circuit, an actuating device for said switch pivotally mounted independently of the axes of said arm and said switch and operatively engaging the switch at a point spaced from the pivotal axis thereof, said actuating device having spaced operating portions lying at opposite sides of said arm for engagement and operation thereby when the arm is swung in opposite directions whereby to move the switch to circuit closing position subsequent to engagement of the contacts on the arm with said fixed contacts.

4. In a reversing switch for controlling the circuits of reversible chair raising electric motors, said switch being of the class wherein a movable member carrying a plurality of contacts is adapted to be moved to opposite sides of a normal circuit breaking position for engagement with a plurality of fixed contacts at each side of said position adapted to cooperate with the contacts of said removable member to effect reversal of the motor circuit, the combination with said fixed and movable contacts, of an auxiliary switch adapted for connection with the motor circuit and for cooperation with the first mentioned switch to close the motor circuit, said auxiliary switch having a pivotal support on which it is mounted to swing to and from circuit closing position, and an operating element for the auxiliary switch mounted to swing independently of the pivotal support for said switch to move the latter to circuit closing position subsequent to engagement of the contacts of said movable member with said fixed contacts, said operating element being mounted to swing upon a pivotal support independent of said movable contact carrying member and being responsive to said member when the latter is moved to either side of said normal circuit breaking position.

CHARLES R. MEITZLER.